(12) United States Patent
Malshe et al.

(10) Patent No.: US 6,168,744 B1
(45) Date of Patent: *Jan. 2, 2001

(54) PROCESS FOR SEQUENTIAL MULTI BEAM LASER PROCESSING OF MATERIALS

(75) Inventors: Ajay P. Malshe; Arzu M. Ozkan; William D. Brown, all of Fayetteville, AR (US)

(73) Assignee: Board of Trustees University of Arkansas, Little Rock, AR (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/946,712

(22) Filed: Oct. 8, 1997

Related U.S. Application Data

(60) Provisional application No. 60/028,250, filed on Oct. 8, 1996.

(51) Int. Cl.[7] ................................. B29C 35/08
(52) U.S. Cl. .................. 264/400; 264/430; 264/482
(58) Field of Search .................... 264/400, 430, 264/482

(56) References Cited

U.S. PATENT DOCUMENTS

| | | | |
|---|---|---|---|
| 5,490,963 | * 2/1996 | Fleischer et al. | 264/400 |
| 5,554,335 | * 9/1996 | Fields et al. | 264/400 |
| 5,643,523 | * 7/1997 | Simpson | 264/400 |

* cited by examiner

*Primary Examiner*—Christopher A. Fiorilla
(74) *Attorney, Agent, or Firm*—J. M.(Mark) Gilbreth; Mary A. Gilbreth; Gilbreth & Assoc. P.C.

(57) ABSTRACT

A method of processing a substrate by first processing the substrate surface with a laser operating at a first wavelength to both evaporate a portion of the substrate and structurally weaken the substrate surface, and then by processing the substrate surface with a laser operating at a second wavelength to remove the structurally weakened surface.

3 Claims, 4 Drawing Sheets

PROCESS FOR SEQUENTIAL MULTI BEAM LASER PROCESSING OF MATERIALS

RELATED APPLICATION DATA

This application claims priority from U.S. Provisional Application Ser. No. 60/028,250 filed on Oct. 8, 1996.

BACKGROUND OF THE INVENTION

1. Field of the Invention

The present invention relates to materials and to methods and apparatus for processing materials. In another aspect, the present invention relates to diamonds and diamond related materials, and to methods and apparatus for processing diamonds and diamond related materials. In even another aspect, the present invention relates to polished and/or planarized diamonds and to methods and apparatus of polishing and/or planarizing diamonds. In still another aspect, the present invention relates to polished and/or planarized substrates, and to methods and apparatus for laser polishing and/or planarizing substrates. In yet another aspect, the present invention relates to polished and/or planarized diamond materials, and to methods and apparatus for polishing and planarizing diamond materials utilizing at least two wavelengths of laser light.

2. Description of the Related Art

As the best thermal conductor known, diamond is the ultimate choice as a substrate material for the fabrication of denser, smaller and faster electronic packages. Prior art efforts have focused on designing manufacturing transparent technologies for post-synthesis processing (polishing, planarization, metallization, die attach) of diamond substrates.

Diamond, while it could be very useful for many electronics applications, presents extreme processing problems.

Chemical vapor deposited (CVD) diamond is attractive due to its high thermal conductivity, high electrical resistivity, low coefficient of thermal expansion, and extreme hardness. Now, as free-standing CVD diamond substrates are readily available in different sizes at reasonable cost, the consideration of diamond for commercial applications is viable.

State-of-the-art CVD-diamond technology produces CVD diamond films that are non-uniform in crystal orientation, chemical quality, grain size and thickness across the diamond surface. Large surface roughness (2–30 microns) and non-uniformity across the surface often limit the usefulness of diamond films for thermal management and numerous other applications. Particularly for MCM applications, the roughness affects heat spreading efficiency due to insufficient contact between the attached devices and the diamond substrate. Roughness also introduces discontinuities and reliability problems for the electrical interconnections. These issues must be addressed by polishing and planarizing CVD-diamond films. Various conventional and non-conventional agents (diamond grit abrasion, chemicals, ion beam, photons, hot metal, filling) have been used for trimming, polishing and planarizing diamond substrates.

Particularly, there are many approaches to polishing diamond films discussed in the literature, including hot metal polishing, diamond grit abrasion, chemical polishing, and ion beam irradiation polishing.

In conventional mechanical polishing diamond impregnated metal polishing wheels are used to grind the surface of the diamond. This is a very slow process and as of yet is unlikely to be practical or economical.

Chemical-mechanical polishing of diamond utilizes an iron wheel, and a technique based on the chemical reaction between diamond and a heated iron wheel. The diamond sample is polished with an iron wheel maintained at a temperature of about 600° C. in the presence of atomic hydrogen. The sharp tips of the diamond film are polished by the local conversion of the diamond into graphite and the diffusion of the graphite into the hot iron. The atomic hydrogen serves to remove the carbon from the iron and prevents saturation of the iron by carbon. A variation of this process involves the use of compacted manganese powder placed in contact with the rough diamond to achieve surface planarization.

Unfortunately, these techniques can be time consuming, expensive, and contaminate the surface.

Another technique discussed in the literature utilizes high energy pulsed lasers for the smoothening of the diamond surface. Depending upon the wavelength utilized the diamond may undergo heating, sublimation, band-gap photon reaction, graphitization followed by sublimation, and the like.

Lasers offer a quick and inexpensive method to trim/polish selected small or large areas at high speeds without significant chemical contamination of the surface. Sufficiently powerful and rapid lasers can process thick diamond substrates in a matter of seconds. This can occur in air without the need for a vacuum or special chemical environment, further reducing the cost, making this a robust and manufacturing transparent process.

However, even the laser techniques are in need of improvements.

The following articles and patents relate to processing of diamonds.

"Excimer laser etching and polishing of diamond Films", A. Blatter et al., J. Electrochem. Soc., 91 (1991) 352, discloses the use of a KrF excimer laser to cause surface modification and etching of diamond films.

"Excimer-laser etching of diamond and hard carbon films by direct writing and optical projection", M. Rothschild et al., J. Vac. Sci. Technol., January/February 1986, discloses the use of laser-induced microchemical etching as an alternative to ion-etching. It further discloses that the ArF laser, at a wavelength of 193 nm, is particularly suitable for interaction with diamond, since its photon energy of 6.4 eV at this wavelength is higher than the band-gap of diamond (5.4 eV), making diamond highly absorptive at 193 nm. Still further disclosed is that lasers operating at longer wavelengths, such as the KrF laser operating at 248 nm, interact with diamond via absorption by impurities.

"Smoothening of diamond films with an ArF laser", U. Bogli et al., Diamond and Related Materials, 1 (1992) 782–788, discloses homogeneous large-area smoothening of diamond films using an ArF excimer laser at 193 nm.

"Excimer laser processing of diamond films", S. M. Pimenov et al., discloses the use of a KrF excimer laser operating at 248 nm wavelength for etching and smoothening of polycrystalline diamond films. It further discloses that "laser smoothing in a scanning mode is thought to be an effective method in the first stage of [diamond film] surface treatment, followed by hot metal polishing or by a conventional abrasive technique at the final stage of [diamond film] surface polishing.

"Laser processing of diamond and diamond-like films", V. P. Ageev et al., Materials & Manufacturing Processes, 8(1), 1–8 (1993), discloses the use of XeCl or KrF excimer lasers at wavelengths of 308 nm and 248 nm, respectively, for etching, patterning and writing on diamond films.

"Modelling of self-limiting laser ablation of rough surfaces: application to the polishing of diamond films", V. N. Tokarev et al., Diamond and Related Materials 4 (1995) 169–176, discloses a theoretical model for the interaction of excimer laser radiation with rough polycrystalline diamond films. Further disclosed is a self-limiting laser ablation technique which allows faceted films to be smoothed without wasteful ablation of the bulk. Experiments were carried out utilizing an XeCl excimer laser for self-limiting laser ablation.

"Fine patterning of diamond films by laser-assisted chemical etching in oxygen", V. G. Ral'chenko et al., Diamond and Related Materials 4 (1995) 893–896, discloses the use of a low power continuous wave Ar+ laser for etching of diamond films.

U.S. Pat. No. 5,458,827, issued Oct. 17, 1995 to Holly, discloses a method of polishing and shaping diamond and other superhard material surfaces. The method generally includes diffusion smoothing of the diamond surface with hot reactive metals. The method includes shaping the smoothed diamond surface by laser ablation using a pulsed laser beam from a UV excimer KrF laser operating at $\lambda$=247 nm or a Q-switched pulsed YAG laser, operating at its second or fourth harmonic wavelength. Finally, the method includes ion-beam assisted polishing of the ablated diamond surface to an optical smoothness.

U.S. Pat. No. 5,490,963, issued Feb. 13, 1996, to Fleischer et al., discloses a process for shaping thin, free-standing diamond film having a rough growth surface. First, the process consists of cutting the rough growth surface with a Nd:YAG laser to form a plurality of first ridges. Next, the film is translated in a direction parallel to the surface and rotated along an axis of rotation perpendicular to the surface. The laser cutting is then repeated to form a plurality of second ridges. Finally, the method includes lapping the growth surface to reduce the height of the second ridges.

"Laser polishing of diamond", K. V. Ravi et al., discloses use of a high energy Nd:YAG Q-switched pulsed laser to selectively heat the diamond surface in an oxygen containing atmosphere to locally oxidize the diamond resulting in smoothening of the diamond surface.

"Excimer laser-assisted planarization of thick diamond films", R. K. Singh et al., Journal of Electronic Materials, Vol. 25, No. 1, 1996, discloses the use of sample rotation during excimer laser-assisted planarization to reduce the formation of surface ripples.

However, in spite of these advancements in the prior art, none of these prior art references disclose or suggest the processing of diamonds with two or more wavelengths of laser light.

Thus, there is still a need for an improved method of laser processing of diamonds.

There is another need in the art for a method of processing diamonds with two or more wavelengths of laser light.

These and other needs in the art will become apparent to those of skill in the art upon review of this specification, including its drawings and claims.

SUMMARY OF THE INVENTION

It is an object of the present invention to provide for an improved method of laser processing of hard materials, diamond and diamond-related materials.

It is another object of the present invention to provide for a method of processing materials with two or more wavelengths of laser light.

These and other objects of the present invention will become apparent to those of skill in the art upon review of this specification, including its drawings and claims.

According to one embodiment of the present invention, there is provided a method for processing a diamond film having an initial surface roughness $R_0$ to reduce the surface roughness to a final surface roughness $R_F$. The method is the sequential application of lasers of different wavelengths, and generally includes applying a first wavelength of laser light to the diamond surface to reduce the surface roughness on at least a portion of the surface to an intermediate surface roughness $R_I$. The method further includes applying a second wavelength of laser light to said portion of the diamond surface having an intermediate surface roughness $R_I$, to reduce the surface roughness of at least a part of said portion to a final surface roughness $R_F$.

DETAILED DESCRIPTION OF THE INVENTION

Figure 1:
FIG. 1 is a schematic of the experimental set-up for laser polishing of the Examples.

The process of the present invention includes a first step of modifying the surface roughness of the target material with a laser operating at a first wavelength. The process also includes a subsequent step of modifying the surface roughness of the target material with a laser operating at a second wavelength. The modification applied is generally reduction of surface roughness, although other modifications to the surface such as planarization or synthesis may be applied.

As can be seen by reference to the articles and patents discussed above, the technique of reducing the surface roughness of a diamond film by application of one wavelength of laser light is well known.

The novelty of the present invention is not dependent upon any particular type of laser technique for any of the two laser steps, and thus any of the prior art techniques may be utilized in the practice of the two laser steps of the present invention. Thus, all of the herein cited articles and patents are herein incorporated by reference for all that they teach.

Lasers suitable for use in the present invention include gas and liquid lasers, solid-state lasers, semiconductor lasers. Non-limiting examples of gas and liquid lasers include, Free electron, iodine vapor, He-Ne, $CO_2$, Ion, Helium-Cadmium, and Nitrogen lasers, and excimer lasers such as $F_2$, ArF, KrF, XeCl, XeF lasers. Non-limiting examples of solid-state lasers include ruby, YAG-type, Nd-YAG, Nd-glass, NdLa phosphorous pentaoxide, LNP, and Ti-sapphire lasers. Non-limiting examples of semiconductor lasers include III–IV compound and II–VI compound lasers.

The wavelength of light utilized in the second laser processing step is a different wavelength from the wavelength of light utilized in the first laser processing step. It is anticipated that in some instances, the wavelength of light utilized in the second laser processing step is greater than the wavelength of light utilized in the first laser processing step, whereas in other instances, it is lesser than the wavelength of light utilized in the first laser processing step.

Preferably in the practice of the present invention, the wavelength of light utilized in the first laser processing step will be greater than the wavelength of light utilized in the second laser processing step.

Selection of the wavelengths to utilize for the first and second lasers will generally depend upon many factors, including but not limited to the following.

Characteristics of the material used;
Type of the material used, i.e., insulator, metal, semiconductor, ceramic, composite, thin film, free-standing substrate, etc.;
Governing Laser Material Interaction Phenomenon, i.e., photochemical, physical, single photon interaction, ablation, or thermal;
Type of the process desired, i.e., polishing, planarization, surface trimming, drilling, cutting, heat treatment, or bonding, etc.
Results desired, i.e., reducing surface roughness from X to Y, heat treatment of composites, or cutting or drilling X mm holes;
Manufacturing considerations, such as cost, time efficiency, etc.

The processing method of the present invention may or may not change the material phase or chemistry and preferably will not change the material phase or chemistry.

It must be understood that the present invention is illustrated mainly by reference to having two laser processing steps, however more steps as desired may be utilized. It is preferred that the wavelength of light utilized decrease with each step.

It is anticipated that the present invention may be utilized for many types of material processing, including trimming, polishing, drilling, cutting, planarization, and heating.

While the present invention is illustrated mainly by reference to the sequential use of two lasers of different wavelengths, it must be understood that more lasers may be utilized as desired.

While the present invention is illustrated mainly by reference to processing of CVD diamond substrates, it must be understood that the present invention will find utility in the processing of other types of substrates. Non-limiting examples of other materials which may be process according to the present invention include insulators, semiconductors, polymers, composite materials, ceramics, diamonds as well as other diamond-related materials, coatings, free standing substrates, as well as super hard materials, and combinations thereof.

EXAMPLES

These Examples are provided merely to illustrate the invention and are not meant to limit the scope of the claim.

Procedure

A Nd-YAG laser (Continuum, powerlite 3000) at 532 nm wavelength is used to trim the substrate surface and to create a structurally-damaged microstructure. By using the second harmonic of the Nd-YAG laser, infrared beam induced excess surface heating is avoided and laser-induced material evaporation for coarse material removal and macro-flattening is achieved. Apart from the material removal, a second intention is to create a chemically degraded/structural damage induced layer to allow aggressive surface absorption for the following radiation treatment. An ArF excimer laser (Lambda Physicks, LPX300) at 193 nm wavelength is used to remove the Nd-YAG laser generated damaged layer and micro-flatten the surface. All example runs were carried out in air at atmospheric pressure to further reduce the complexity of the setup and the cost of polishing.

Figure 3A:
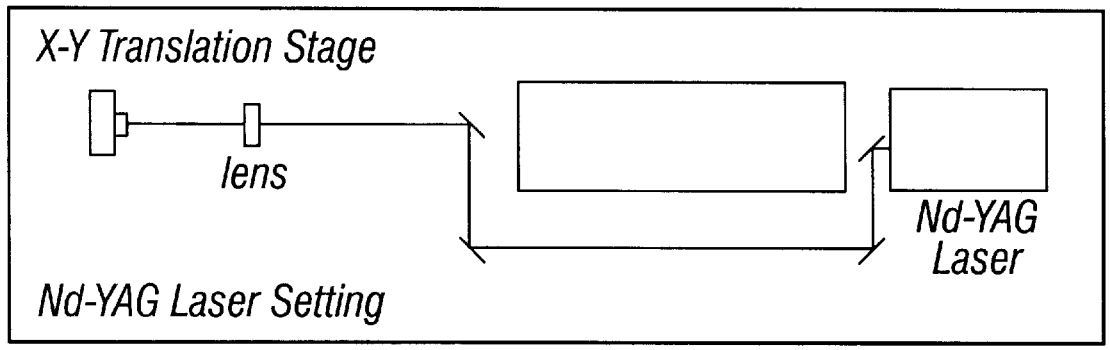
FIGS. 3A and 3B are detailed schematic top views and side views of the experimental set-up for laser polishing of the Examples.
Figure 3B:
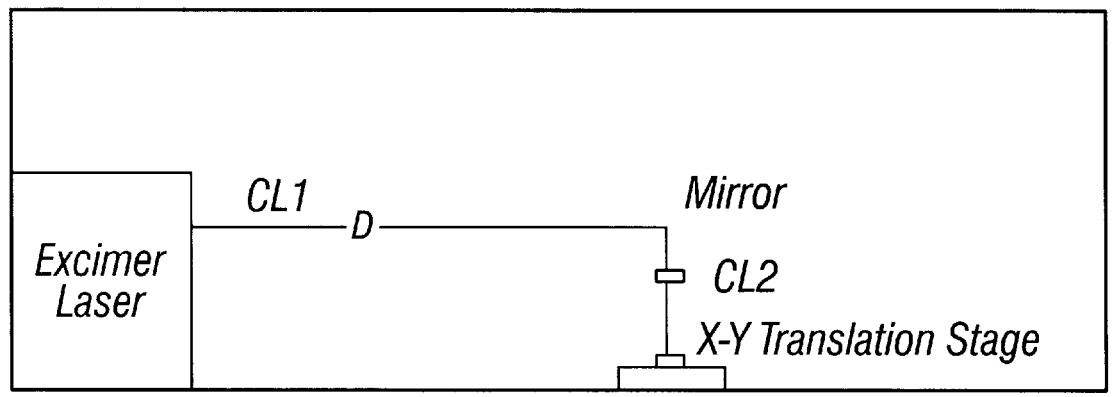

700 $\mu$m to 1000 $\mu$m thick free-standing CVD diamond substrates with an average surface roughness of 20 $\mu$m to 30 $\mu$m and an average grain size of 150–200 um were used. Schematics of the experimental set-up for laser polishing are presented in FIGS. 1, 3A and 3B. A frequency doubled Nd-YAG laser operating at 532 nm and a 15 ns pulse width was used at five different energy densities ranging from 3.2 J/cm$^2$ to 800 J/cm$^2$ to investigate the effect of energy densities on average surface roughness. All the samples were treated using the Nd-YAG laser followed by an ArF excimer laser operating at 193 nm and a 15 ns pulse width at an energy density of 16.5 J/cm$^2$ (pre-optimized value for material removal).

The location of the laser focus with respect to the surface of a sample makes a difference in the planarization results. Furthermore, the optimum focus point is different for thick films, where the average peak-to-valley distance is of the order of 70–80 $\mu$m, and thin films where the average peak-to-valley distance is of the order of 100 $\mu$m. In these examples, the laser beam is focused at the center of the average peak-to-valley distance. In both wavelength cases, the laser is focused on the sample which is mounted on an X-Y translation stage with a reproducible positioning resolution of 1 um and controllable values of scanning velocity. The Nd-YAG laser trimming is done using continuous scanning at a rate of 1.2 mm/min at a laser repetition of 10 Hz. Excimer laser trimming is done using continuous scanning and variable scan rates of 0.06, 0.12 and 0.6 mm/min.

The dimension of the rectangular beam spot projected onto the sample via transmissive and reflective optics was 100 $\mu$m×10 mm for the Excimer laser. The circular beam spot for the Nd-YAG laser was 100 $\mu$m in diameter. In the polishing process, the size of the laser spot perpendicular to the direction of scanning was kept close to half the average grain size in co-ordination with the continuous scanning to achieve efficient and uniform material removal, and thus, diamond grain flattening.

The surface roughness of the samples was measured using a Dektak mechanical surface profilometer. The Dektak scanning parameters were: scan length=1500, 800, 100 $\mu$m; scan speed=low; stylus force=20 N; tip radius =12.5 $\mu$m. The surface roughness ($R_a$) of the samples was determined to be 20 $\mu$m to 30 $\mu$m. The peak-to-valley distance was 80–90 um, and the maximum height of the peaks was 100–120 um. It should be noted that the surface roughness measured by Dektak does not represent the true morphology of the surface, since the waviness of the surface and macro-cavities are underestimated.

Experimental Results—Physical Analysis

Results of laser trimming and polishing were evaluated using the material removal rate, scanning electron microscopy SEM (Hitachi, S2300), Dektak surface profilometry, and Raman spectroscopy ($\lambda$=514.45 nm with laser spot size=1 mm; ISA 1000).

Figure 2:
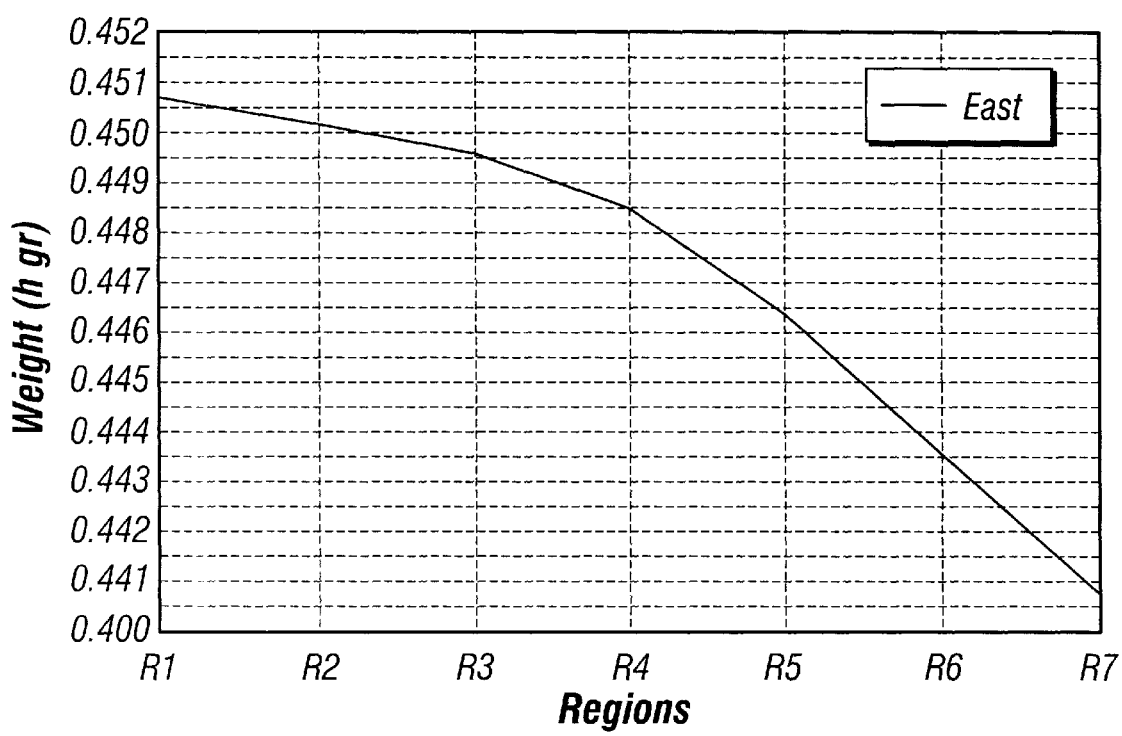
FIG. 2 is a graph showing the weight loss for Nd-YAG laser trimming as a function of energy density for the Examples.

FIG. 2 shows the weight loss for Nd-YAG laser trimming as a function of energy density. Measurable weight loss was observed using Nd-YAG laser irradiation for all the energy densities. The material removal rate shows a saturation trend as the energy density increases. Weight loss was not measurable for excimer laser irradiation. However, from the the SEM results presented previously, there is some material removal.

Under the optimized conditions, $R_a$ was reduced from 25–30 μm to 5 μm (+/−1 μm) by the Nd-YAG laser and further reduced to <1 μm by the excimer laser irradiation. The peak-to-valley distance was reduced from 85 μm to 20 μm after Nd-YAG laser treatment and further reduced to <10 μm after excimer laser irradiation.

Figure 4:
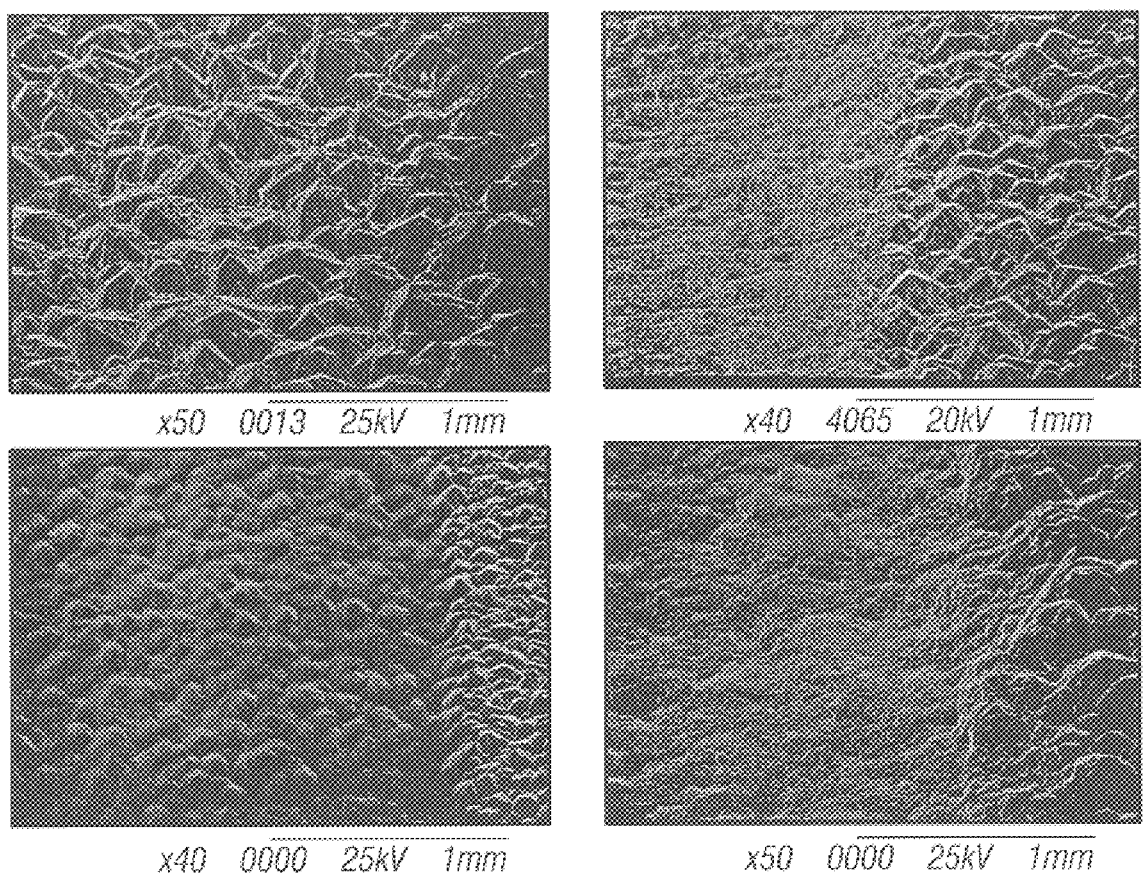
FIG. 4 show for the Examples, SEM micrographs (at a magnification of 300) of the (a) untreated, (b) only Nd-YAG laser treated (c) only excimer laser treated, and (d) Nd-YAG laser treated, followed by excimer laser polished, sample surface under optimized conditions.

When measuring the average surface roughness ($R_a$) of the diamond substrates, various scan lengths were used. For the original surface where the grain size varies between 150 and 250 μm, a 1500 μm scan length was chosen in order to ensure that the scan measured a minimum of 5 to 10 diamond crystallite peaks. After Nd-YAG laser irradiation, as shown in FIG. 4, the grain size reduced to 25 to 50 μm, and an 800 μm scan length was used. For the polished surface, shown in FIG. 4, where individual crystallites are not distinguishable, a 100 μm scan length was used.

Referring to FIG. 4 there is shown SEM micrographs of the (a) untreated, (b) only Nd-YAG laser treated (c) only excimer laser treated, and (d) Nd-YAG laser followed by excimer laser polished sample surface under the optimized conditions at ×50 and ×300 magnifications. FIG. 4 shows that there is significant grain size and orientation with respect to the substrate surface of the sample. FIG. 4 shows that after Nd-YAG laser irradiation the original well-faceted surface morphology has been completely changed. The large crystallites are microscopically flattened with the small granular surface morphology representing the laser-induced damaged surface microstructure. Further, FIG. 4 demonstrates that if the granular ND-YAG laser-induced morphology is exposed to an excimer laser beam, the granular microstructure is flattened at a microscopic level further reducing the average surface roughness as discussed in the previous paragraph. However, of laser passes. FIGS. 3D and 4 show the surface morphology if the as-deposited surface is only exposed to the excimer laser radiation at 16.7 J/cm² and 1000 laser pulses at one spot. The treatment leads to the rounding off of the sharp diamond peaks.

Experimental Results—Chemical Analysis

Figure 5:
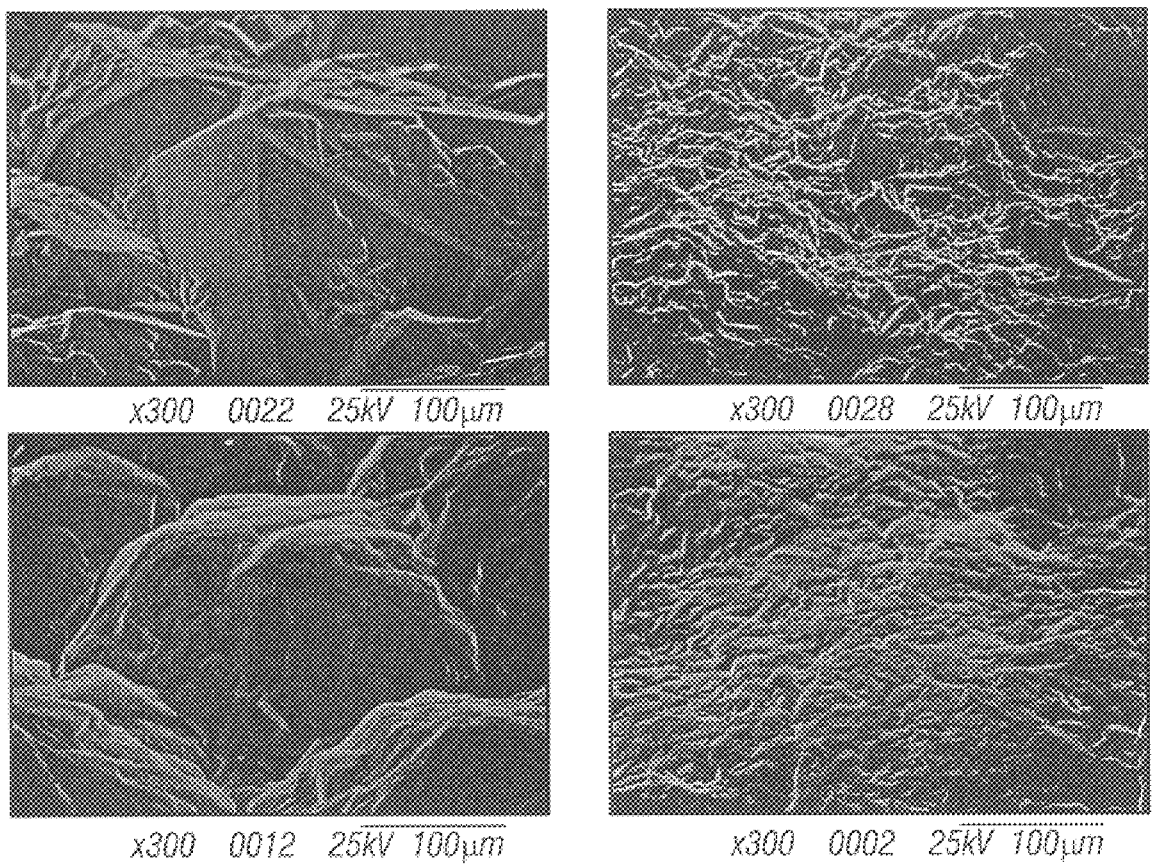
FIG. 5 show for the Examples, Raman spectra of the (a) untreated, (b) only Nd-YAG laser treated (c) only excimer laser treated, and (d) Nd-YAG laser treated, followed by excimer laser polished, sample surfaces.

FIG. 5 show the Raman spectra of the (a) untreated CVD diamond substrate, (b) Nd-YAG laser treated samples, (c) only excimer laser treated, and (d) Nd-YAG laser followed by excimer laser treated diamond substrate. The Raman spectrum of the untreated diamond sample shows the dominant diamond peak at 1332 cm$^{-1}$(+/−2 cm$^{-1}$) on a rising background. Upon irradiation of the samples with five different energy densities, the diamond Raman signal decreases significantly, however there is no observable signature of amorphous carbon (at 1550 cm$^{-1}$), microcrystalline graphite (1350 cm$^{-1}$) or long-range ordered graphite (at 1580 cm$^{-1}$). A comparison of FIG. 5 show that upon exposure of the diamond surface previously exposed to 500 mJ of Nd-YAG laser radiation to 193 nm excimer laser radiation, the Raman signal recovers to its original value. In the case when the sample is exposed to 400 mJ of excimer laser radiation, complete recovery is not achieved, but the recovery trend is evident. In an effort to understand the excimer laser radiation/diamond interaction, the CVD diamond substrate was exposed to 193 nm excimer laser radiation at 16.7 J/cm$^{-1}$ for 1000 pulses with continuous scan. FIG. 5 shows the Raman of the surface of the sample. The Raman shows a sharp diamond peak with a considerably reduced intensity on a rising background as compared to the original diamond surface. Also, a small hump, just like the one from the original sample surface, due to a trace amount of amorphous carbon is present. However, significant generation of graphite was not observed for laser-treated diamond substrates as has been observed by many other researchers for very thin film diamond films.

Discussion of Results

The objective of the Examples was to explore a laser based technique for efficient and manufacturing transparent polishing (microscopically smoothening and macroscopic flattening) of CVD diamond substrates. In the investigation, a doubled Nd-YAG at various energy densities was utilized to explore the effect of 532 nm radiation on a CVD diamond surface. 532 nm wavelength radiation is partially transparent to thermal management quality CVD diamond (thermal conductivity of 12–15 W/cm-K). Although the photon energy is 2.33 eV, which is less than the band gap of diamond (5.4 eV), photon absorption in the CVD diamond is assumed to occur by low energy interband gap states resulting from lattice defects such as twins, dislocations and inter-grain non-diamond chemical impurities. As is observed from the weight loss measurements, the material removal rate increases as the Nd-YAG laser incident energy increases. However, a saturation trend is observed for energies≧400 mJ.

While not wishing to be limited by theory, the inventors note the following.

Based on current observations, it appears that the material removal process occurs by evaporation. As the energy density increases, the plasma density increases, as does the temperature. Further, the evaporation process may be limited by the increased plasma absorption due to the intense plasma formation at high energy densities or due to redeposition of evaporated material. It is found that the Nd-YAG laser is instrumental for macro-material removal and for synthesizing a uniformly damaged surface microstructure on the surface of diamond films. The damaged microstructure may contain an enhanced density of defect energy states near the ground state level, producing selective absorption of Nd-YAG laser radiation near the surface of the film. To the sensitivity of Raman spectroscopy, we have been unable to observe any graphitization of diamond films treated with a Nd-YAG laser, an excimer laser, or a Nd-YAG laser followed by an excimer laser. The following are significant observations:

the absence of graphitization with reduction in the diamond peak after Nd-YAG or after excimer laser treatment;

the reduction in the intensity of the diamond Raman peak (1332 cm$^{-1}$), followed by recovery of intensity of the same peak after excimer laser treatment.

These may be due to one of the following effects or some combination thereof:

When a diamond surface is treated in air, thermal evaporation is followed by oxidation, and possibly nitridation of the evaporants and the diamond surface. The nitrided diamond surface may be highly absorptive of the incident Raman signal, as well as the reflected Raman signal;

Surface evaporation by Nd-YAG laser radiation may also provide a shock wave in the diamond causing, in addition to a damaged surface microstructure, damage to the diamond lattice in the form of micro-defects and macro-defects. This fine microstructure (or fine crystallites) may cause an increase in light scattering and absorption, and thus, may lead to a reduction in the 1332 cm$^{-1}$ Raman signal.

The excimer laser is well known for the surface treatment of this material. The excimer laser is instrumental for micro-flattening of the Nd-YAG laser-induced damaged surface and, at the same time, removal of the damaged/ oxidized/nitrated unclean surface. This micro-flattening (removal of the damaged microstructure) is instrumental in improving the Raman signal. Also, the existence of such a damaged layer on the surface leads to enhanced absorption and, at the same time, treatment in air may result in instant oxidation of the evaporants. Unlike Pimonove et al., these Examples did not exhibit any evidence of excimer laser-induced graphitization of the diamond surface. Pimonove et al. irradiated the undamaged surface of a diamond thin film in vacuum with very low energy intensities. However, we have treated Nd-YAG laser damaged and undamaged diamond substrates in air with an excimer laser. In the case of a previously undamaged surface, a substantial decrease in the Raman signal with no measurable graphitization was observed. In the case of the previously damaged surface, recovery of the Raman signal with no measurable graphitization was observed.

In this Example, the combination of a Nd-YAG laser and an excimer laser was chosen for removal of bulk material from the surface quickly. Governing principle of 532 nm wavelength laser light interaction with diamond is thermal heating of the surface, and nonlinear multi-photon interaction of the given wavelength due to diamonds wide band gap. The excimer laser at 193 nm wavelength was chosen for high absorbtivity of diamond of this wavelength. Diamond interacts with 193 nm light well and yields fine smoothing of the surface via ablation.

The present processing approach is very suitable for coarse polishing of rough diamond substrates for thermal management. To adapt the technique to manufacturing, high power and high repetition rate Nd-YAG and excimer lasers are required. From processing time estimations based on these Examples, it would take 40 seconds using a 1 KHz Nd-YAG laser followed by 10 seconds using a 1 KHz excimer laser, for a total of 50 seconds to process a 1 cm$^2$ diamond substrate. Thus, 50 seconds is required to reduce the Ra from 30 um to $\leq$1 um. If desired, such processed diamond films can be further smoothed and/or planarized for packaging applications using the filling-for-planarization process. It is important to note that the laser polishing/planarization technique does not require:

Any special treatment medium such as oxygen, argon, vacuum, etc.; or

Glancing incidence angle of the laser beam with respect to the diamond substrate surface being treated.

It is important to note that the final $R_a$ achieved in this work can be improved by decreasing the size of the laser spot in combination with an increased number of laser passes. The technique is non-contact, contamination-free, adaptable for small or large areas, easily automated, and without any bulk heating.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A method for processing a diamond film substrate said method comprising:

(a) applying a first wavelength of laser light to a diamond film substrate having a surface, said surface having an initial surface roughness, $R_0$, to both evaporate a portion of the substrate surface and create a structurally weakened surface having an intermediate surface roughness, $R_I$; and (b) applying a second wavelength of laser light to at least a portion of the structurally weakened substrate surface having an intermediate surface roughness, $R_I$, to remove the structurally weakened surface to modify the surface of at least a part of said portion to a final surface roughness, $R_F$, wherein said first and second wavelengths of laser light are different wavelengths of laser light.

2. The method of claim 1 wherein the first wavelength is greater than the second wavelength.

3. The method of claim 1 wherein the first wavelength is less than the second wavelength.

* * * * *